United States Patent [19]

Gallo

[11] Patent Number: 5,099,604
[45] Date of Patent: Mar. 31, 1992

[54] ARTIFICIAL STEM FOR A CUT FLOWER

[76] Inventor: Joseph C. Gallo, 19 Oriole Rd., Medfield, Mass.

[21] Appl. No.: 491,454

[22] Filed: Mar. 9, 1990

[51] Int. Cl.⁵ ............................................. A01G 5/00
[52] U.S. Cl. ............................................................ 47/55
[58] Field of Search ...................... 47/55, 41.12, 41.13

[56] References Cited

U.S. PATENT DOCUMENTS

| | | | |
|---|---|---|---|
| 144,446 | 11/1873 | Craig | 47/55 |
| 2,331,440 | 10/1943 | Thomas | 47/55 |
| 3,150,462 | 9/1964 | Gallo . | |
| 3,321,866 | 5/1967 | Gallo . | |
| 3,553,889 | 1/1971 | Gallo . | |
| 3,928,936 | 12/1975 | Wollen | 47/55 |
| 4,106,234 | 8/1978 | Gallo . | |
| 4,281,474 | 8/1981 | Gallo | 47/55 |
| 4,481,732 | 11/1984 | Gallo . | |

Primary Examiner—David A. Scherbel
Assistant Examiner—Joanne C. Downs
Attorney, Agent, or Firm—Fish & Richardson

[57] ABSTRACT

An artificial stem for a natural cut flower, which includes a water absorbent element, e.g., one or more chenille wires or a sponge. The chenille wires, i.e., a plurality of water absorbent fibers supported between twisted wires, are capable of storing water and providing a path for water to flow to the flower. They also provide good frictional and water-transmitting contact with the cut flower.

7 Claims, 7 Drawing Sheets

ARTIFICIAL STEM FOR A CUT FLOWER

BACKGROUND OF THE INVENTION

The invention relates to an improved artificial stem for a natural cut flower.

Natural cut flower arrangements such as corsages and bouquets that contain stephanotis flowers, e.g., short stemmed flowers such as lilies and orchids which grow in clusters on a main stalk, are usually made by cutting the flowers from the stalk and mounting the cut flowers on artificial stems of various lengths. Non-stephanotis flowers such as carnations are likewise often cut and mounted on artificial stems. Corsages, for example, can be made by impaling the severed end of a flower onto a short wire holder. Similarly, bouquets of flowers can be made by mounting the stalks or stems of flowers over a length of wire combined with a wire holder. Flowers that are so arranged are usually kept fresh by adding moisture to reservoirs in the wire holders. An example of such a holder is described in Gallo, U.S. Pat. No. 4,281,474.

One example of an artificial stem is Gallo, U.S. Pat. No. 3,321,886, which describes a stephanotis flower holder comprising a wire stem and a cylindrical wrapping of water absorbent cotton which is secured to the wire stem with water-proofed tape. Other artificial stems use a length of "flocked wire" in place of the wire stem. For example, Gallo, U.S. Pat. No. 3,553,889, describes an artificial stem constructed of flocked wire, i.e., stiff wire having a rough covering of textile material. The use of the flocked wire artificial stem is also described in Gallo, U.S. Pat. No. 4,106,234, which describes an artificial stem having an exterior tube, a flocked wire positioned within the tube, and a length of water absorbent cotton wrapped about the flocked wire. Gallo, U.S. Pat. No. 3,150,462, describes a fresh flower holder comprising a stiff flocked wire and a layer of water absorbent material, e.g., cotton or fibrous plug, which is wrapped around or positioned over the flocked wire and secured with a wrapping, e.g., water-repellent adhesive tape.

U.S. Pat. application Ser. No. 07/294,165, filed in 1989, describes an artificial stem which includes an exterior tube having an opening at one end for receiving the stem of a flower and a second interior tube within the exterior tube that establishes a stem-receiving channel between the interior and exterior tubes. A flower is inserted and held in the channel primarily by friction. A strip of water-absorbent material, e.g., blotter paper, is also positioned within the tube and provides a path for water to flow to the flower.

SUMMARY OF THE INVENTION

The invention features, in a first aspect, an artificial stem in which a length of chenille wire is used as the water reservoir. The chenille wire is twisted about a coated (e.g., flocked) wire, and a tube is placed around the chenille wire so as to compress the chenille fibers. The tube is closed at one end except to allow passage of the coated wire. At the other end, the tube is open to receive the stem of the flower. The chenille fibers are selected to be sufficiently fine in diameter to absorb and hold water. In preferred embodiments, the chenille wire is wrapped in a helical coil about the coated wire, or alternatively twisted about the coated wire at one point so that two free ends extend toward the open end of the tube, to form a stem receiving channel with the tube.

In a second aspect of the invention, the chenille wire is left exposed (without the surrounding tube) so that the stem can be inserted within a stephanotis flower. The interior of the stephanotis flower makes an interference fit with the fibers of the chenille wire. That fit tends to hold the flower on the artificial stem and enhance transmission of moisture from the chenille wire to the flower.

In a third aspect of the invention, an elongated tube open at both ends surrounds a length of chenille wire. The chenille fibers are compressed by the surrounding tube, and are capable of absorbing and transporting water, upwardly against gravity, to a flower inserted at the upper end of the tube.

In further aspects of the invention, a sponge material replaces the chenille wire. In preferred embodiments, the sponge material is impaled midway between its ends by the coated wire, and the ends of sponge material are bent back to provide two free ends that make contact with the cut flower.

The invention has several advantages. The chenille wire and sponge material are superior at drawing and storing water. This advantage is enhanced by the use of tubes in some embodiments to cover the water absorbent elements (to retard evaporation of the stored water) and to compress the chenille fibers to enhance water absorption and transmission. Also, in stephanotis flower embodiments, the water absorbent elements are in full contact with the interior of the cut flower, resulting in greater friction between the artificial stem and the flowers and providing sturdier flower arrangements. Finally, each embodiment of the artificial stem requires minimal skill to assemble and use, thus lowering both the cost of manufacturing the stems and the chances of damaging valuable flowers.

Other advantages and features will become apparent from the following description, and from the claims.

DESCRIPTION OF THE PREFERRED EMBODIMENT

Figure 1:
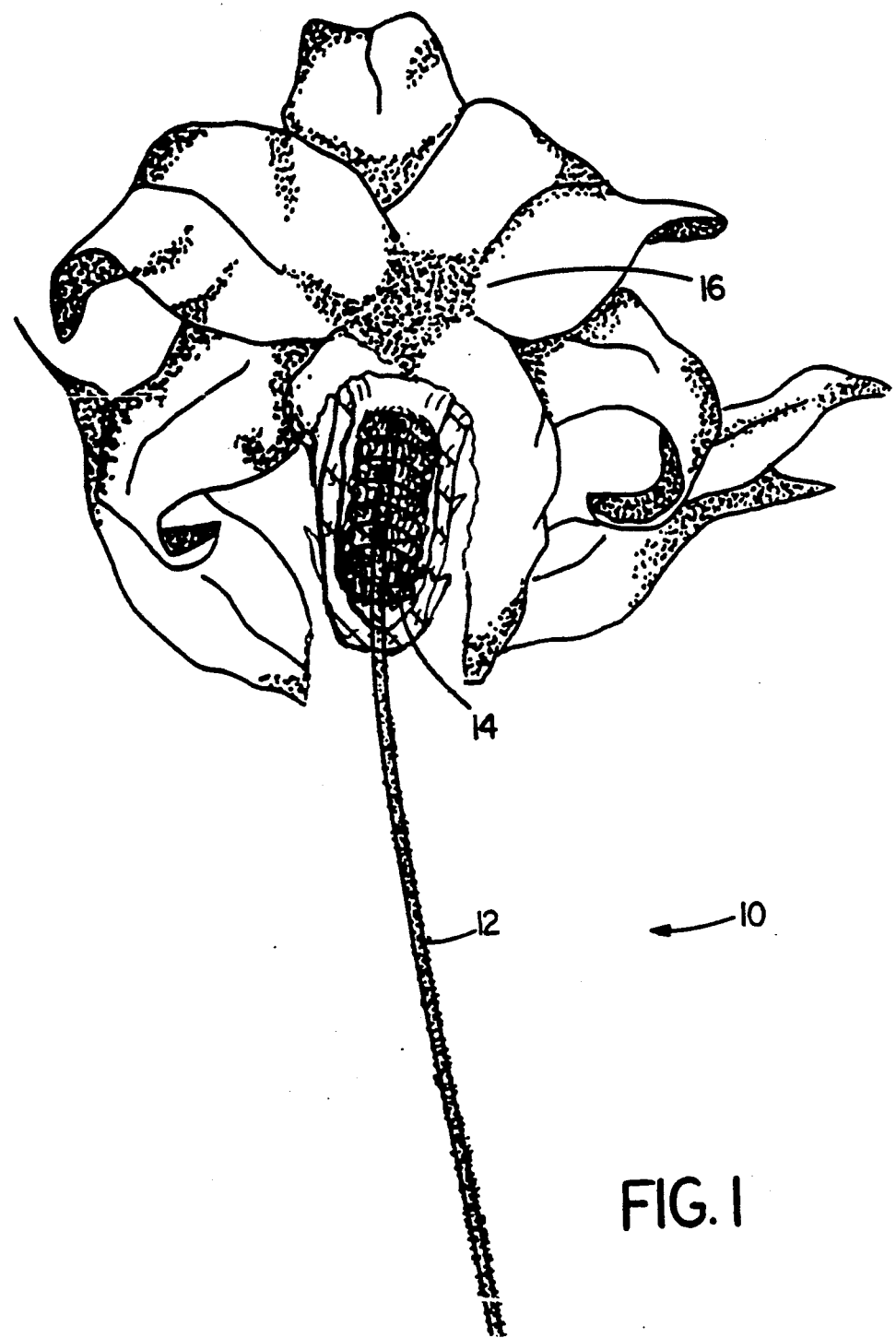
FIG. 1 is a perspective view partly sectioned of a natural flower and an artificial stem according to the present invention.

A first artificial stem particularly suited for use with stephanotis flowers is shown in FIG. 1. As shown, an artificial stem 10 includes a length of flocked wire 12, i.e., stiff metal wire which is covered with a water absorbent textile material. The artificial stem 10 further includes a single length of chenille wire 14 (e.g., Stock No. 800MS, M. J. Malloy, Boston, Mass.) which is wrapped in a helical fashion around a portion of the flocked wire 12. The chenille wire 14 has fibers that are sufficiently fine that the fibers form between themselves small spaces capable of absorbing water. As shown, a stephanotis flower 16, can be installed on the stem 10 or the stem 10 can be passed through the flower 16 from above which, in either case, results in the flower 16 being positioned around the chenille wire 14. The chenille fibers make an interference fit with the interior of the stephanotis flower, i.e., they would naturally extend further radially than the interior of the flower, and are compressed by the flower interior. This enhances contact between the chenille wire and the flower, and allows the flower to draw water from the reservoir. The interference fit also provides friction between the chenille wire 14 and the flower 16 that tends to hold the flower firmly in place in its arrangement. When the artificial stem 10 is passed through the flower from above, the chance of damaging the flower is decreased.

Figure 2:
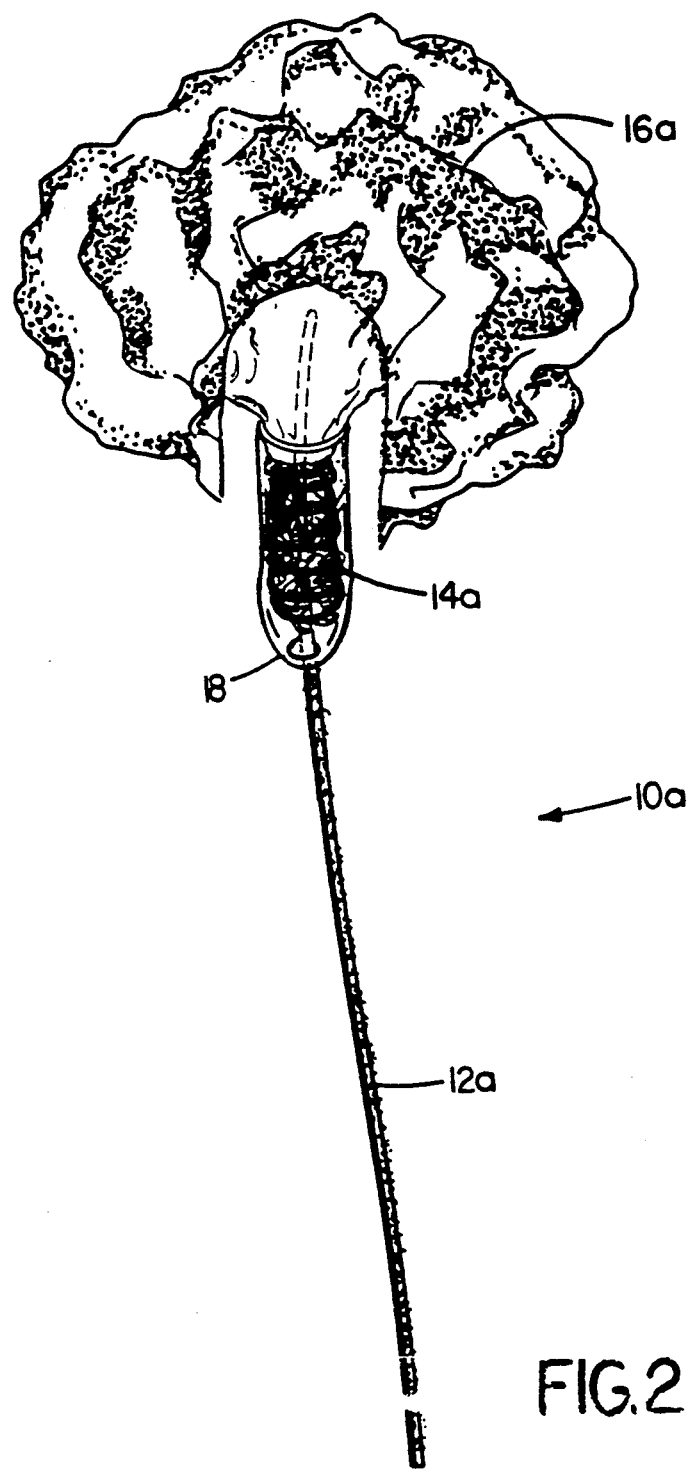
FIG. 2 is a perspective view partly sectioned of a natural flower and a second embodiment of the artificial stem shown in FIG. 1.

Another artificial stem, one particularly suited for use with corsages, is shown in FIG. 2. Artificial stem 10a is constructed of a flocked wire 12a which extends from a chenille wire 14a wrapped in a helical fashion around a portion of the flocked wire. A plastic tube 18, approximately ¼ to ⅜ inch in diameter, surrounds the chenille wire, and makes an interference fit with the radially extending chenille fibers, tending to compress the fibers inwardly. The tube not only prevents water loss, but in compressing the mass of chenille fibers enhances the ability of the chenille wire to absorb water. As shown, a natural flower 16a, e.g., a carnation, can be impaled upon the portion of flocked wire 12a that extends above the chenille wire 14a. This results in the stem of the flower 16a being firmly seated against the coil of chenille wire 14a. The chenille wire acts like a coil spring to press the chenille wire against the base of the flower stem, thus helping to assure that water transmission to the stem is maintained. The chenille wire acts as a water reservoir. Water is absorbed and held in the small spaces between the fine fibers of the chenille wire. The ability of the chenille wire to absorb water is enhanced by wrapping the wire into a coil and by placing the coil inside the tube, because both actions tend to compress the fibers and make the spaces between the fibers more suited to absorbing water.

Figure 3:
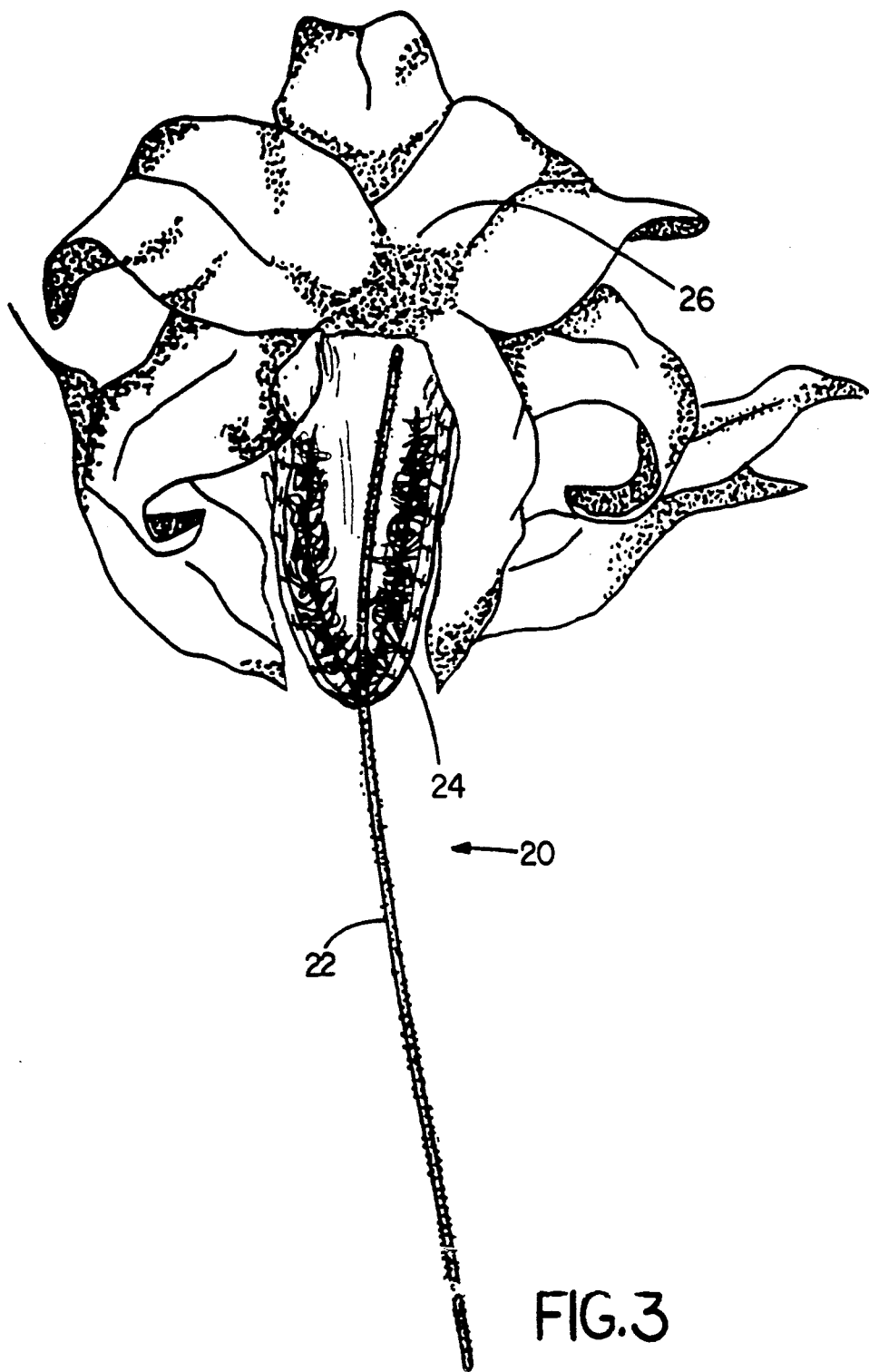
FIG. 3 is a perspective view partly sectioned of a natural flower and a second artificial stem according to the present invention.
Figure 4:
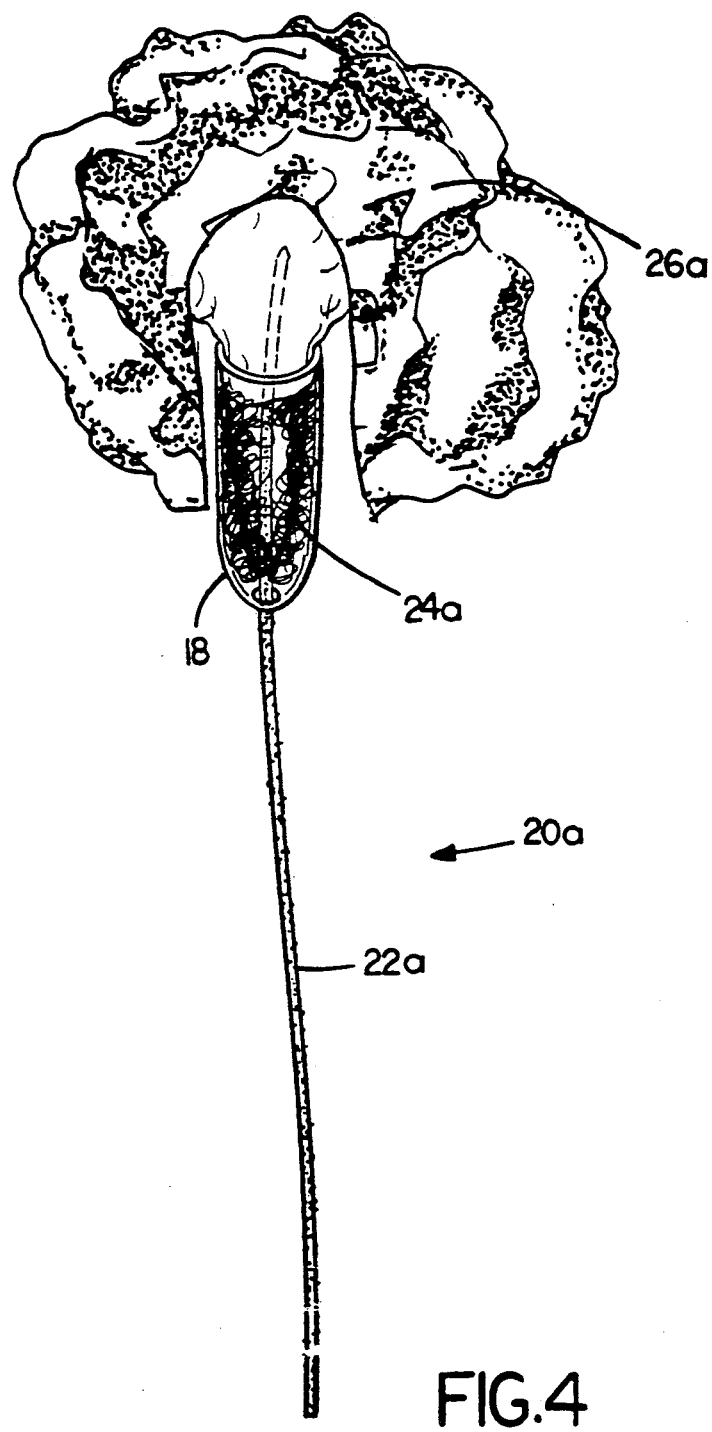
FIG. 4 is a perspective view partly sectioned of a natural flower and a second embodiment of the artificial stem shown in FIG. 3.

A second artificial stem, more preferred than the first described, is shown in FIGS. 3 and 4. The principal difference from the embodiment of FIGS. 1 and 2 is that the chenille wire 24 is twisted at one point about the flocked wire 22 at one point to produce two free ends. The ends of the chenille wire are allowed to extend outwardly along the flocked wire. The artificial stem 20 can be passed through a natural flower from above and be positioned within the flower, with the free ends of chenille wire making an interference fit with the interior of the flower. Just as with the embodiment of FIGS. 1 and 2, the flower 26 is in contact with the reservoir and friction between the chenille wire 24 and the flower 26 tends to hold the flower firmly in place. This embodiment is simpler to manufacture than the artificial stems of FIGS. 1 and 2, as less work is needed to twist the chenille wire 24 around the flocked wire 22 than to wrap the chenille wire into a helical form.

Figure 5:
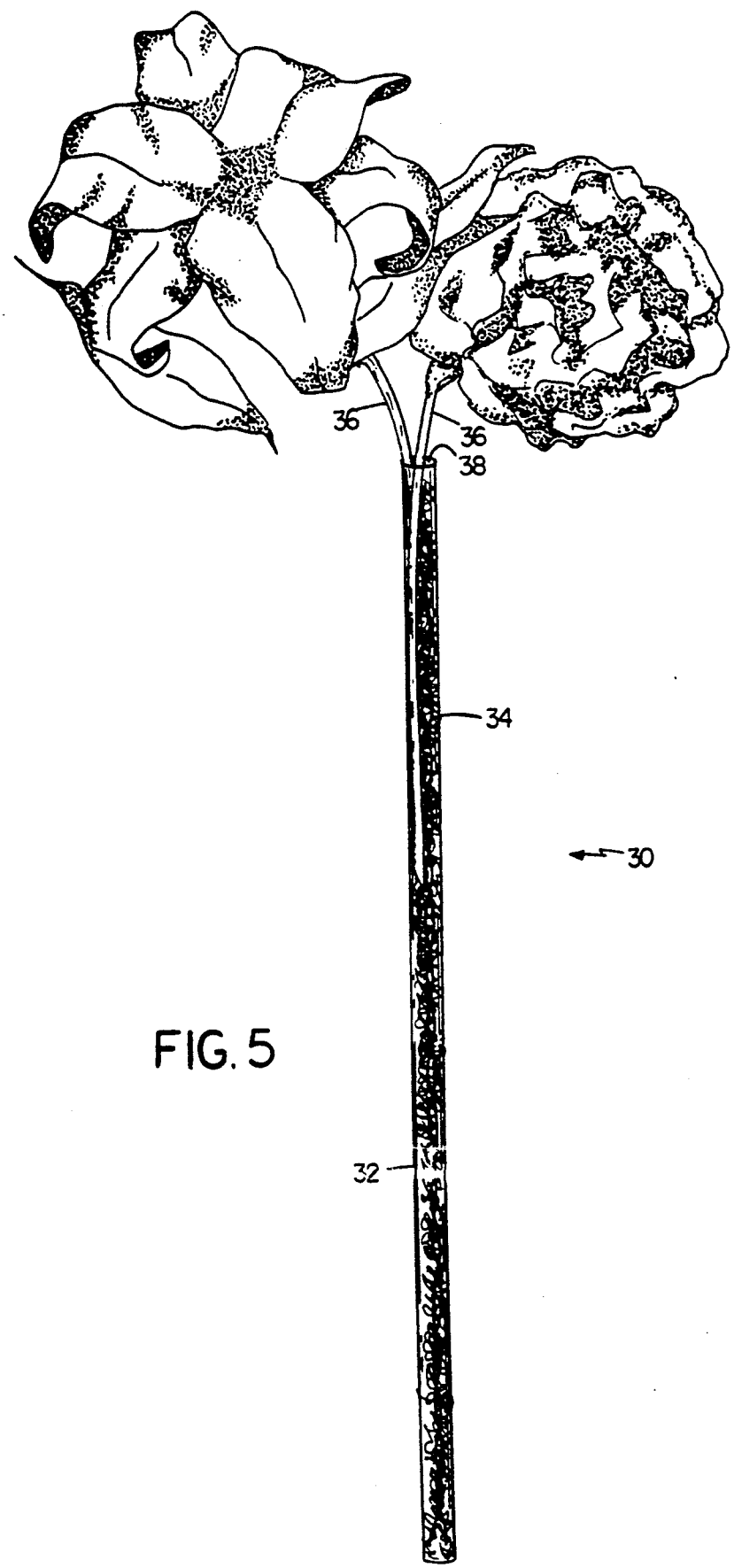
FIG. 5 is a perspective view partly sectioned of a natural flower and a third artificial stem according to the present invention.

A third variation of the artificial stem, which is suited to providing an elongated stem for naturally short-stemmed flowers, and to allowing more than one flower (or a flower and a piece of foliage) to be installed, is shown in FIG. 5. As shown, an artificial stem 30 is constructed of a plastic tube 32, approximately ¼ to ⅜ inch in diameter and 8 inches in length, having openings at both ends. The stems of a number of natural cut flowers 36 can be received at one end, and the other end may be placed in a reservoir of water. Positioned within the tube 32 and secured in place (e.g., by glue) are one or more chenille wires 34. The wires 34 can be twisted around one another as shown or laid parallel to one another, without twisting (not shown). Also, a short length of chenille wire may be attached (e.g., by twisting) to one end of a long length of chenille wire so that two ends of chenille wire appear at one end of the tube and a single end of wire at the other end; such an embodiment can accomodate narrow flower stems at one end (the end with two ends of chenille wire), and wider stems at the other. Just as in the embodiment of FIG. 4, the chenille wires 34 establish with the tube 32 a stem-receiving channel 38 into which the natural stems of the flowers 36 may be inserted. Friction holds the flowers 36 firmly in the tube 32. The chenille wires 34 are in full contact with the natural stems of the flowers and can easily draw water to the flowers. The fibers of the chenille wire are compressed when inserted into the tube, thus assuring good water absorption and transport capability. The artificial stem 30 is easily assembled and easily used, without damaging a flower as the flower is inserted into the stem.

Figure 6:
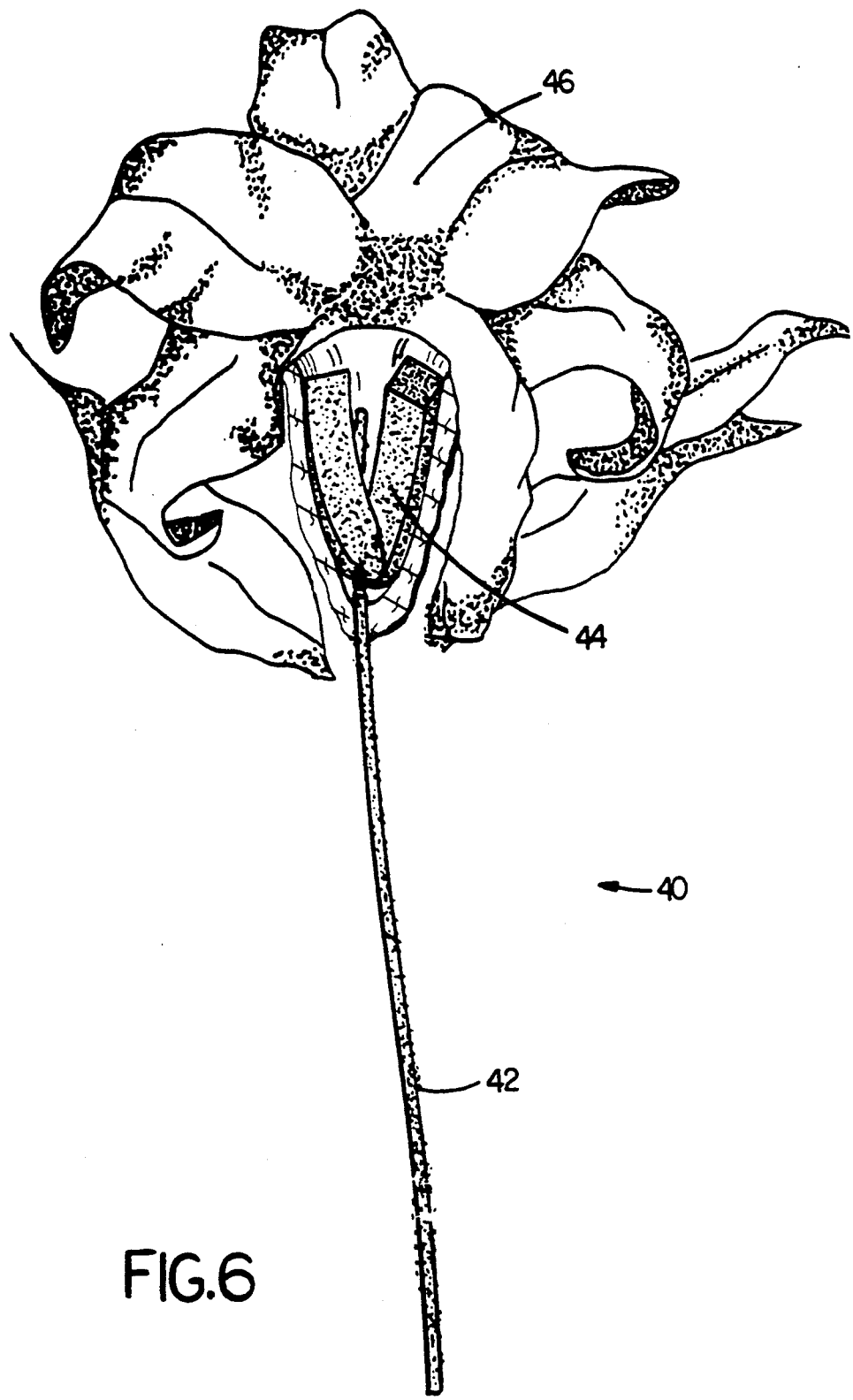
FIG. 6 is a perspective view partly sectioned of a natural flower and a fourth artificial stem according to the present invention.
Figure 7:
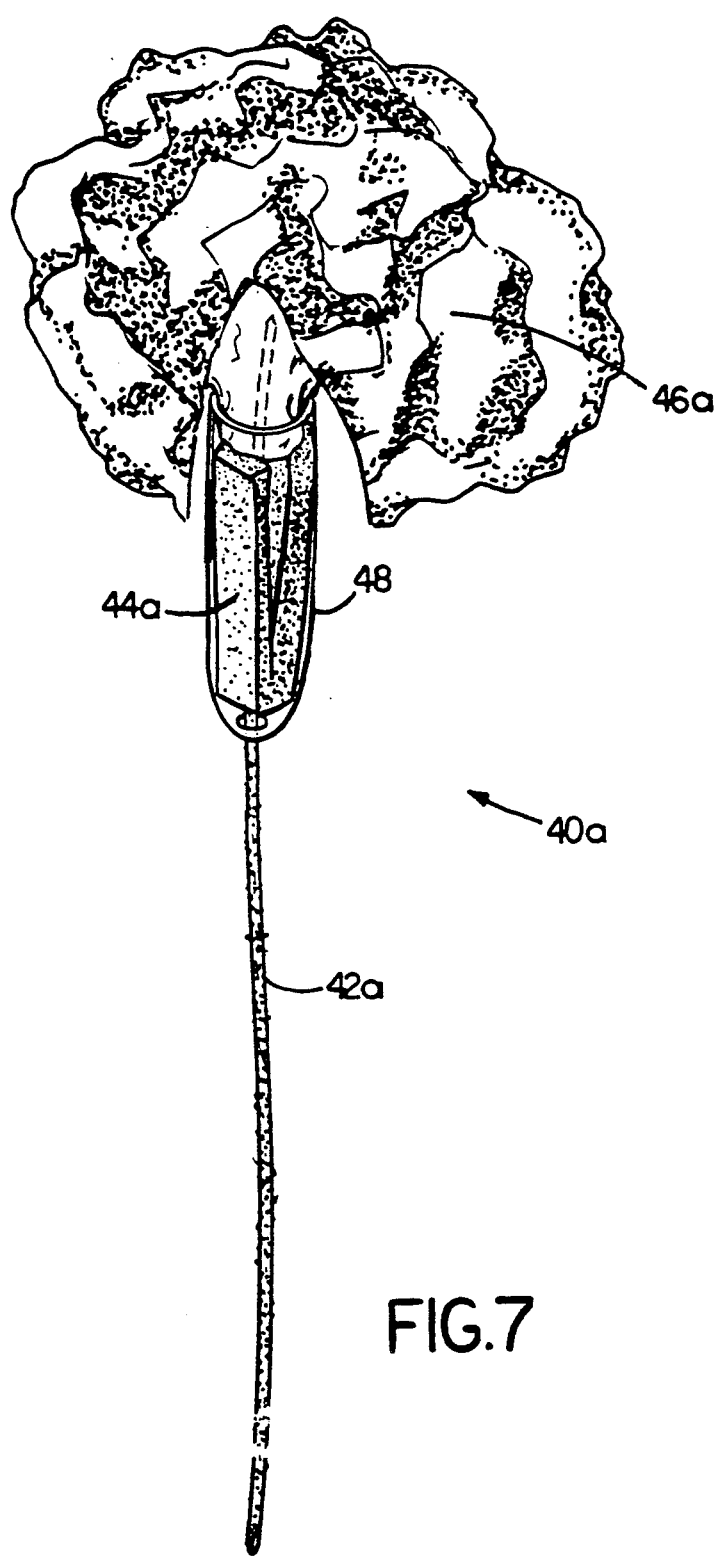
FIG. 7 is a perspective view partly sectioned of a natural flower and a second embodiment of the artificial stem shown in FIG. 7.

A fourth type of artificial stem is shown in FIGS. 6 and 7. A sponge element rather than chenille wires is used to draw and store water. Referring to FIG. 6, a fourth artificial stem 40, which is particularly suited to stephanotis flowers, includes a length of flocked wire 42 and a sponge element 44 which is impaled at its midpoint upon the flocked wire. The ends of the sponge element 44 extend from the flocked wire 42 and easily fold upwards when the artificial stem 40 is passed through a flower 46, e.g., an orchid. The flower 46 is in direct contact with the entire reservoir, and friction between the sponge element 44 and the flower 46 tends to hold the flower firmly in place. The artificial stem 40 is simple to mass produce since very little work is required to impale the sponge element 44 on the flocked wire 32.

In the embodiment of FIG. 7, a tube 48 is added in a manner similar to that described in connection with the artificial stems of FIGS. 2 and 4.

Other embodiments are within the following claims.

I claim:

1. An artificial stem for a natural cut flower of the type having a natural stem and a base, said stem extending at the base of the flower, said artificial stem having a flower end at which said flower is connected to the artificial stem, said artificial stem comprising:

a coated wire, said wire having one end on which said flower stem is to be impaled, said one end of said coated wire being of sufficiently narrow diameter to permit said stem to be impaled at said one end of said coated wire, said coated wire being suited for attachment to an article of clothing, a length of chenille wire attached to said coated wire at the flower end of said artificial stem, said chenille wire being attached to said coated wire at at least one point by twisting of said chenille wire about said coated wire, and said chenille wire being attached to said coated wire so that there are at least two free ends of chenille wire extending along the length of said coated wire toward said one end of said coated wire, a preformed, water-impervious tube surrounding said chenille wire at the flower end of said artificial stem, said tube being closed at its end furthest from the flower stem except to allow passage of said coated wire through said end of said tube, said tube being open at its end closest the flower stem, and said tube making an interference fit with the fibers of said chenille wire so that when installed on said chenille wire the chenille fibers are compressed, said free ends of said chenille wire forming with said tube a stem receiving channel capable of frictionally gripping the flower stem when the stem is impaled on the coated wire and inserted into the open end of said tube, said chenille fibers being sufficiently fine in diameter that when compressed by said tube they are capable of absorbing and holding water.

2. The stem of claim 1 wherein said coated wire is flocked wire.

3. An artificial stem for a natural cut flower of the stephanotis type in which the cut flower has a tubular base, the artificial stem having a flower end at which said flower is connected to the artificial stem, and the artificial stem having at the flower end an artificial water reservoir for placement inside the tubular base of the flower, said artificial stem comprising:

a coated wire, said wire being suited for attachment to an article of clothing, a length of chenille wire attached to said coated wire at the flower end of said artificial stem, said chenille wire being attached to said coated wire at at least one point by twisting of said chenille wire about said coated wire, and said chenille wire being attached to said coated wire so that there are at least two free ends of chenille wire extending along the length of said coated wire upward in the direction of the flower, the fibers of said chenille wire extending generally radially so as to be capable of making an interference fit with the flower interior without harming the flower, said chenille fibers being sufficiently fine in diameter that when said stem is installed with the flower interior the fibers are capable of absorbing and holding water.

4. The stem of claim 3 wherein said coated wire is flocked wire.

5. An artificial stem for a natural cut flower of the type having a natural stem extending at the base of the flower, said artificial stem having two ends, a flower end into which said natural stem is to be inserted, and an open end through which water is drawn, said artificial stem comprising:

an elongated, preformed, water-impervious tube open at both ends, one end of said tube forming said flower end of said artificial stem and the other end of said tube forming said open end of said artificial stem, a chenille wire element comprising at least one chenille wire extending the length of said elongated tube, said chenille wire being doubled at the flower end of said tube so that two or more free ends of chenille wire extend along the length of said tube to said flower end of the tube, and wherein said free ends form with said tube a stem receiving channel capable of frictionally gripping the flower stem when the stem is inserted into the open end of the tube, said tube having an interior diameter smaller than the radial extent of the fibers of said chenille wire so that when said tube is installed on said chenille wire the tube makes an interference fit with the fibers so that the fibers are compressed, said chenille fibers being sufficiently fine in diameter that when compressed by said tube they are capable of absorbing and transporting water upwardly against gravity from the lower end of said tube to the upper end.

6. The stem of claim 5 wherein said chenille wire element is secured to said tube.

7. The stem of claim 6 wherein said chenille wire element is glued to the interior of said tube.

* * * * *